(12) United States Patent
Shimomura et al.

(10) Patent No.: US 9,729,019 B2
(45) Date of Patent: Aug. 8, 2017

(54) ROTOR STRUCTURE OF ROTARY ELECTRIC MACHINE

(75) Inventors: Ryuichi Shimomura, Chiyoda-ku (JP); Masaya Inoue, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 108 days.

(21) Appl. No.: 14/390,816

(22) PCT Filed: May 1, 2012

(86) PCT No.: PCT/JP2012/061557
§ 371 (c)(1),
(2), (4) Date: Oct. 6, 2014

(87) PCT Pub. No.: WO2013/164880
PCT Pub. Date: Nov. 7, 2013

(65) Prior Publication Data
US 2015/0084462 A1 Mar. 26, 2015

(51) Int. Cl.
*H02K 1/28* (2006.01)
*H02K 7/08* (2006.01)
(Continued)

(52) U.S. Cl.
CPC ............... *H02K 1/28* (2013.01); *H02K 1/06* (2013.01); *H02K 1/30* (2013.01); *H02K 7/083* (2013.01);
(Continued)

(58) Field of Classification Search
CPC H02K 1/28; H02K 7/085; H02K 1/22; H02K 5/15; H02K 5/16; H02K 7/083; H02K 1/30; H02K 1/06; H02K 2201/06
(Continued)

(56) References Cited

U.S. PATENT DOCUMENTS

| 5,302,876 A * | 4/1994 | Iwamatsu | H02K 1/278 310/112 |
| 2002/0130580 A1* | 9/2002 | Arai | H02K 1/146 310/214 |

(Continued)

FOREIGN PATENT DOCUMENTS

JP 06153427 A * 5/1994
JP 3023576 B2 3/2000
(Continued)

OTHER PUBLICATIONS

Kobayashi Zenichiro, Rotor Fitted with Permanent Magnet, May 31, 1994, Aichi Emerson Electric, JPH06153427.*
(Continued)

*Primary Examiner* — Burton Mullins
*Assistant Examiner* — Alexander Singh
(74) *Attorney, Agent, or Firm* — Sughrue Mion, PLLC; Richard C. Turner

(57) ABSTRACT

Provided is a rotor structure of a rotary electric machine, which is easily adaptable to offer a wide variety of products. The rotor structure of a rotary electric machine includes at least: a rotor shaft (3); a rotor core including a first rotor core section (15) and a second rotor core section (17); a boss section (9); and a pressurizing section. The second rotor core section and the boss section are arranged on an outer circumference of the rotor shaft. The first rotor core section is arranged on an outer circumference of the boss section. The pressurizing section is positioned on an axially outer side of the rotor core. The second rotor core section is pressurized by an abutment surface of the boss section. The first rotor core section arranged on the boss section is pressurized by the pressurizing section.

9 Claims, 6 Drawing Sheets

(51) Int. Cl.
*H02K 1/30* (2006.01)
*H02K 1/06* (2006.01)

(52) U.S. Cl.
CPC ......... *H02K 7/085* (2013.01); *H02K 2201/06* (2013.01)

(58) Field of Classification Search
USPC ............. 310/90, 216.114, 216.116, 216.008, 310/216.011, 216.025, 216.031, 216.058, 310/216.061
See application file for complete search history.

(56) References Cited

U.S. PATENT DOCUMENTS

| | | | |
|---|---|---|---|
| 2010/0071971 A1* | 3/2010 | Tatematsu | B60L 11/1803 180/65.8 |
| 2010/0219714 A1 | 9/2010 | Abe et al. | |

FOREIGN PATENT DOCUMENTS

| | | | | |
|---|---|---|---|---|
| JP | 2005-102460 A | | 4/2005 | |
| JP | 2005102460 A | * | 4/2005 | |
| JP | 2006-115659 A | | 4/2006 | |
| JP | 2006-238553 A | | 9/2006 | |
| JP | 2006238553 A | * | 9/2006 | |
| JP | 2009-124863 A | | 6/2009 | |
| JP | 2010-004630 A | | 1/2010 | |
| JP | 2011-254663 A | | 12/2011 | |

OTHER PUBLICATIONS

Hattori Hiroyuki; Tsuchiya Katsuhiro; Tatematsu Kazutaka; Kamiya Munehiro; Hayakawa Sei; Wakita Tetsuo, Rotor of Rotating Electric Machine, Toyota Motor Corp, JP 2005-102460, Apr. 14, 2005.*
Hiroshi Aihara; Hirotaka Kuroda, Rotor for Rotary Electric Machine, Toyota Motor Corp, JP 2006238553 (English Machine Translation), Sep. 7, 2006.*
International Search Report for PCT/JP2012/061557 dated Aug. 7, 2012.
Written Opinion for PCT/JP2012/061557 dated Aug. 7, 2012.

* cited by examiner

ROTOR STRUCTURE OF ROTARY ELECTRIC MACHINE

CROSS REFERENCE TO RELATED APPLICATIONS

This application is a National Stage of International Application No. PCT/JP2012/061557 filed May 1, 2012, the contents of all of which are incorporated herein by reference in their entirety.

TECHNICAL FIELD

The present invention relates to a rotor structure of a rotary electric machine.

BACKGROUND ART

In a related-art rotary electric machine, a core is fixed in an axial direction by inserting or press-fitting the core onto an outer circumferential surface of a boss component, and then clamping an end surface of the boss component radially outward (see, for example, Reference 1).

CITATION LIST

Patent Literature

[PTL 1] JP 2011-254663 A

SUMMARY OF INVENTION

Technical Problems

To meet demands in the market, motor lineup needs to offer a wide variety of products. It is considered that the wide variety of products are offered in view of various factors, such as an outer shape of the motor, an entire length of the motor, an axial length of the core, and an output of the motor. Among others, focus is herein made on change in axial length of the core or entire length of the motor.

When the axial length of the core is to be increased, it is considered that the component for fixing the core is set adaptable so that the axial length of the core may be increased. However, the structure of the related-art boss component is an integrated structure that is scooped out on a radially inner side. Therefore, when the related-art boss component is to be set adaptable to the change in axial length of the core, the boss component itself needs to be remodeled for each change in axial length. That is, the related-art boss component is not suited to the increase in axial length of the core or entire length of the motor. When the axial length of the core or the entire length of the motor is to be reduced, conversely, there arises a problem in that a bearing, a resolver, or the like may protrude.

The present invention has been made in view of the above-mentioned circumstances, and it is therefore an object of the present invention to provide a rotor structure of a rotary electric machine, which is easily adaptable to offer a wide variety of products.

Solution to Problems

In order to attain the above-mentioned object, according to one embodiment of the present invention, there is provided a rotor structure of a rotary electric machine, including at least: a rotor shaft; a rotor core including a first rotor core section and a second rotor core section; a boss section; and a pressurizing section. The second rotor core section and the boss section are arranged on an outer circumference of the rotor shaft. The first rotor core section is arranged on an outer circumference of the boss section. The pressurizing section is positioned on an axially outer side of the rotor core. The second rotor core section is pressurized by an abutment surface of the boss section. The first rotor core section arranged on the boss section is pressurized by the pressurizing section.

Advantageous Effects of Invention

According to one embodiment of the present invention, the rotor structure of a rotary electric machine, which is easily adaptable to offer a wide variety of products, can be provided.

DESCRIPTION OF EMBODIMENTS

Figure 1:
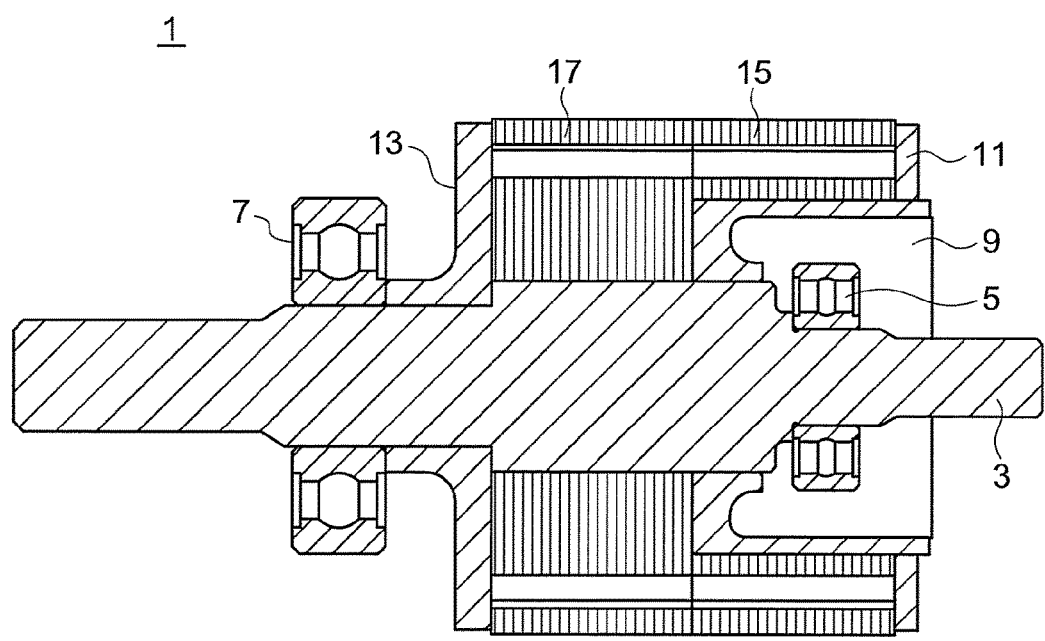
FIG. 1 is a schematic sectional view taken along a plane parallel to and passing through a rotational axis, for illustrating a rotor structure according to a first embodiment of the present invention.

Now, a rotor structure of a rotary electric machine according to embodiments of the present invention is described with reference to the accompanying drawings. Note that, in the drawings, the same reference symbols represent the same or corresponding parts.

First Embodiment

FIG. 1 is a schematic sectional view taken along a plane parallel to and passing through a rotational axis, for illustrating a rotor structure according to a first embodiment of the present invention. FIG. 2 are views illustrating a situation in which the rotor structure is assembled according to the first embodiment.

A rotor shaft 3 of a rotor structure 1 is supported by bearings 5 and 7 in a freely rotatable manner. A boss (boss section) 9 is a cylindrical member, and a radially inner portion thereof is formed into a hollow so as to be scooped out. Thus, the bearing 5 is housed inside the boss 9, and hence an entire length of the motor can be reduced. The boss 9 is arranged on an outer circumference of the rotor shaft 3, and is directly press-fitted onto the outer circumference of the rotor shaft 3.

Further, a ring 11 is arranged on an outer circumference of the boss 9 at one end side of the rotor structure 1. A pressurizing section of the rotor structure according to the present invention is positioned on an axially outer side of a rotor core described later, and is configured to pressurize a stator core from an outer side of the core in an axial line direction (hereinafter also referred to simply as "axial direction") of the rotor shaft 3 toward a center of the core. The ring 11 is taken as an example of this pressurizing section. Further, the ring 11 and the boss 9 are formed of magnetic bodies, and for example, the boss 9 may be formed of a stainless steel member. Thus, a leakage flux to the bearing can be reduced.

Further, a cylindrical member 13 is arranged on the outer circumference of the rotor shaft 3. The cylindrical member 13 is directly press-fitted onto the outer circumference of the rotor shaft 3. The cylindrical member 13 is arranged away from the boss 9 in the axial direction, and a radially inner portion of the cylindrical member 13 is not scooped out unlike the boss 9. Further, the cylindrical member 13 may be formed of, for example, a stainless steel member.

A first rotor core section 15 and a second rotor core section 17, which construct the rotor core, are arranged between the cylindrical member 13 and the ring 11. Each of the first rotor core section 15 and the second rotor core section 17 is formed by stacking a plurality of thin magnetic steel sheets. The plurality of magnetic steel sheets are coupled to each other by dowel clamping.

The first rotor core section 15 and the second rotor core section 17 are different in inner diameter, and the second rotor core section 17 having a relatively smaller inner diameter is fixed onto the outer circumference of the rotor shaft 3. On the other hand, the first rotor core section 15 having a relatively larger inner diameter is fixed onto the outer circumference of the boss 9.

Figure 2A:
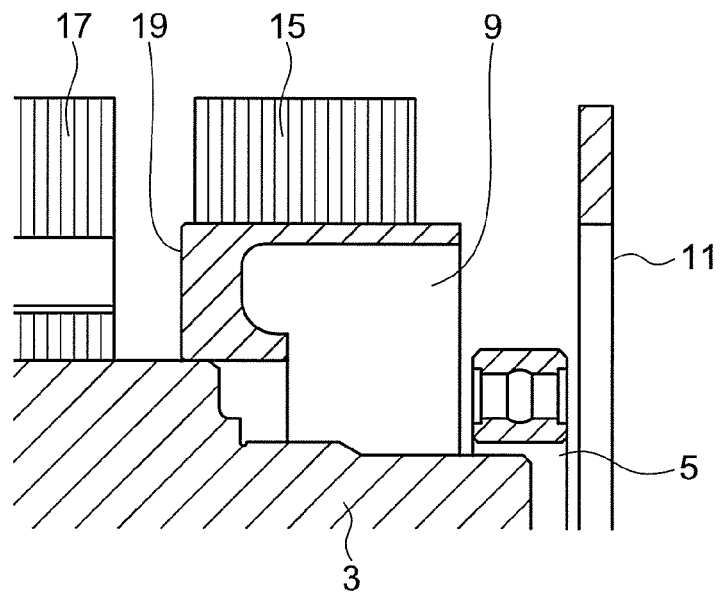
FIGS. 2A and 2B are views illustrating a situation in which the rotor structure is assembled according to the first embodiment of the present invention.

Referring to FIG. 2, description is given of fixation of the first rotor core section 15 and the second rotor core section 17 in the axial direction. Firstly, as illustrated in FIG. 2(a), the boss 9 and the first rotor core section 15 are mounted onto the rotor shaft 3 so that the first rotor core section 15 arranged on the outer circumference of the boss 9 is brought closer to the second rotor core section 17 arranged on the outer circumference of the rotor shaft 3. Note that, the second rotor core section 17 is brought into abutment against the cylindrical member 13 so that the movement of the second rotor core section 17 in a direction opposite to the first rotor core section 15 is restricted.

Figure 2B:
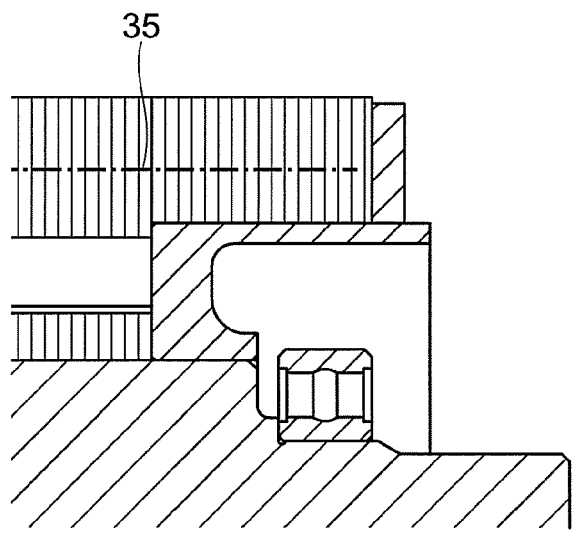

As illustrated in FIG. 2(b), an abutment surface 19 of the boss 9 and the first rotor core section 15 are brought into abutment against the second rotor core section 17, and then the bearing 5 is arranged as illustrated in FIG. 1. Note that, the ring 11 may be arranged on the boss 9 at a timing after the boss 9 is arranged on the rotor shaft 3, or may be fitted onto the boss 9 before the boss 9 is arranged on the rotor shaft 3. The first rotor core section 15 and the second rotor core section 17 are fixed in the axial direction through use of the ring 11 and the abutment surface 19 of the boss 9. With this structure, it is possible to attain offering of a wide variety of products, which has been difficult to attain with a related-art integrated boss component for supporting the entire core.

Figure 3:
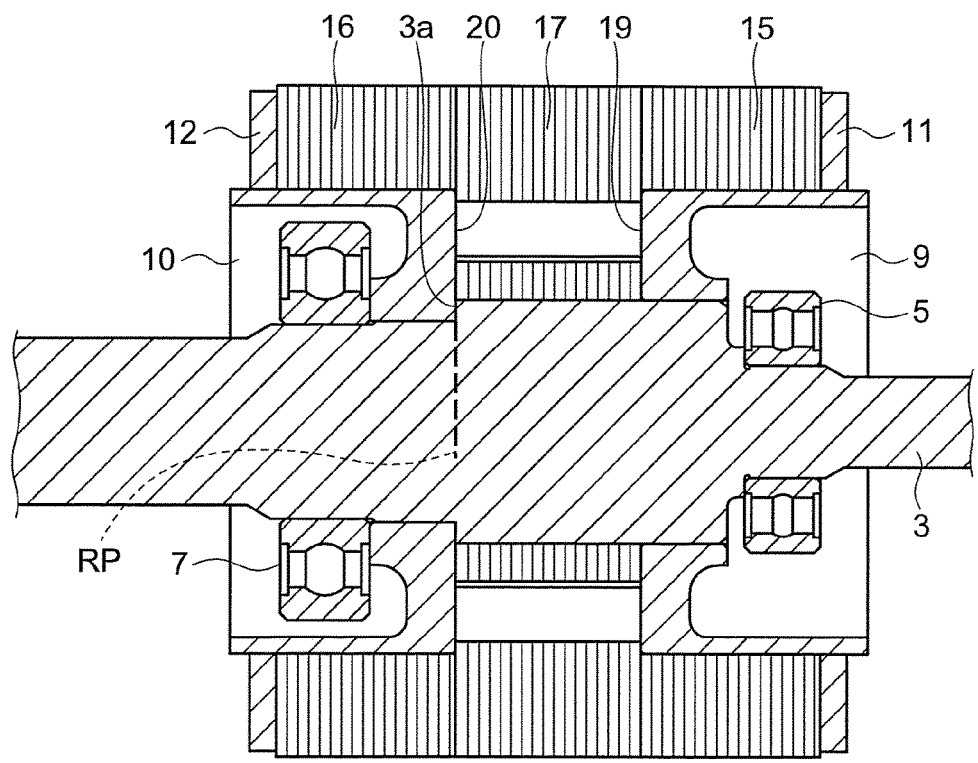
FIG. 3 is an explanatory view illustrating a situation in which an axial length of a core of the rotor structure is extended according to the first embodiment of the present invention.

Further, referring to FIG. 3, description is given of a structure in a case where the entire length of the motor (axial length of the core) is to be increased in the structure of FIG. 1. Firstly, a second boss 10 is press-fitted onto a stepped portion of the rotor shaft 3. At this time, an abutment surface 20 of the second boss 10 is pressed against a shoulder portion 3a of the rotor shaft 3, to thereby function as an assembly reference plane RP. The second boss 10 is directly press-fitted onto the outer circumference of the rotor shaft 3. Further, the second boss 10 may be formed of a magnetic body such as a stainless steel member.

A third rotor core section 16 in a stacked state and a second ring 12 serving as the pressurizing section are arranged on an outer circumference of the second boss 10, and the bearing 7 is arranged inside the second boss 10. Subsequently, the second rotor core section 17 is arranged on the outer circumference of the rotor shaft 3, and the boss 9, the first rotor core section 15, the ring 11, and the bearing 5 are further arranged. Note that, the rotor shaft 3, the bearings 5 and 7, the boss 9, the second boss 10, the ring 11, the second ring 12, the cylindrical member 13, the first rotor core section 15, the third rotor core section 16, and the second rotor core section 17 may be assembled to each other in a press-fitting manner. Further, the second boss 10 and the third rotor core section 16, and the boss 9 and the first rotor core section 15 are easy to handle in the assembly step when those components are assembled in advance as subassemblies, and those subassemblies are assembled to the rotor shaft 3.

The first rotor core section 15, the second rotor core section 17, and the third rotor core section 16 are fixed in the axial direction through use of the ring 11, the abutment surface 19 of the boss 9, the abutment surface 20 of the second boss 10, and the second ring 12. The first rotor core section 15, the second rotor core section 17, and the third rotor core section 16 are brought into abutment against each other without gaps, and are sandwiched by the ring 11, the abutment surface 19 of the boss 9, the abutment surface 20 of the second boss 10, and the second ring 12, thereby securing a suitable strength as the rotor.

Note that, the structure of FIG. 3 is described as the structure in which the axial length of the core is increased in the structure of FIG. 1, but this structure is one interpretation for convenience of the description, and the structure of FIG. 1 may be interpreted as a structure in which the axial length is reduced in the structure of FIG. 3. Further, the structure of FIG. 1 and the structure of FIG. 3 may be interpreted as individual structures having no such relationship that components are added or removed. That is, the structure of FIG. 1 is also regarded as an example of a structure in which only one of the boss components of the stator core is formed separately, and the structure of FIG. 3 is also regarded as an example of a structure in which both the boss components are formed separately.

As described above, in the first embodiment, the second rotor core section 17 is pressurized by the abutment surface 19 of the boss 9, and further, the first rotor core section 15 arranged on the boss 9 is pressurized by the ring 11. Thus, the related-art integrated boss component needs to be remodeled when a motor different in axial length of the core is to be manufactured, resulting in a problem in that the boss component is difficult to adapt to offer a wide variety of products. This embodiment, however, can attain such an effect that a wide variety of products may be offered only by adjusting the number of stacked steel sheets.

Further, unlike the related-art integrated boss component, two separate components are provided, and hence such an effect can be expected that press-fitting loads to be applied from the boss and the cylindrical member to the radially outer portion of the shaft, and a press-fitting load to be applied from the rotor core to the radially outer portion of the boss can be suppressed. Still further, such an effect can be expected that the motor weight can be reduced as compared to the integrated boss component. Still further, the bearing is sunk into the scooped-out radially inner portion of the boss, and hence an effect of reducing the axial length can also be expected. Still further, the integrated boss component is upsized as a whole when adapting to the change in axial length of the core, with the result that material cost and processing cost are increased. When two separate components are provided, however, the components can be prevented from being upsized as a whole, with the result that an effect of reducing material cost and processing cost can also be expected.

Figure 4:
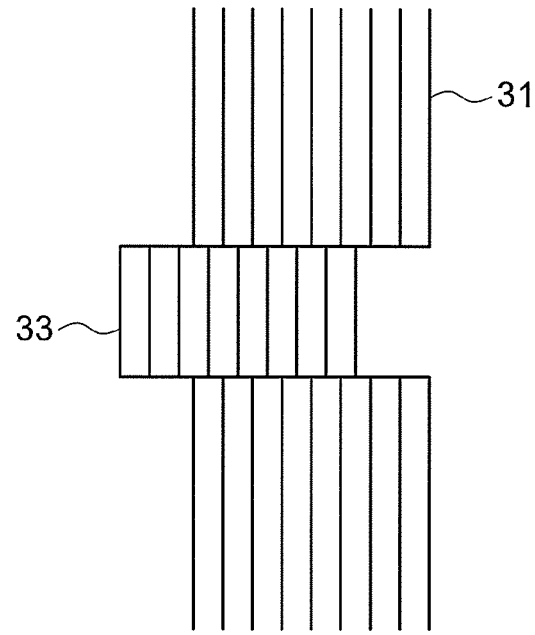
FIG. 4 is a schematic view illustrating, for comparison, a state of dowel clamping, which is widely employed in the related art.
Figure 5:
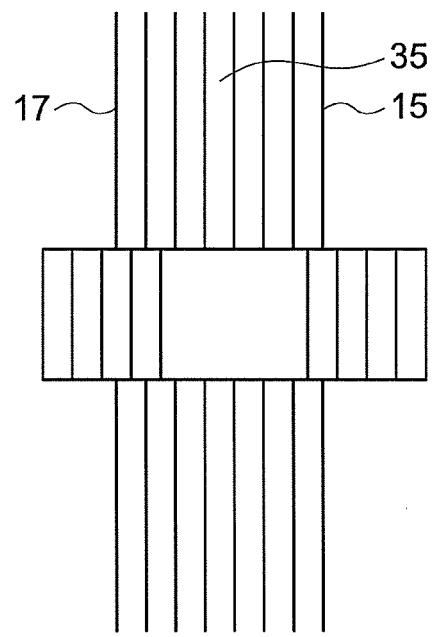
FIG. 5 is a schematic view illustrating a clamp-coupling portion between a first rotor core section and a second rotor core section according to the first embodiment of the present invention.

FIG. 4 is a schematic view illustrating, for comparison, a state of dowel clamping, which is widely employed in the related art. FIG. 5 is a schematic view illustrating a clamp-coupling portion between the first rotor core section and the second rotor core section according to the first embodiment. Reference symbol 35 of FIGS. 5 and 2(b) represents a clamp-coupling portion 35 between the second rotor core section 17 inserted onto the rotor shaft 3 and the first rotor core section 15 inserted onto the boss 9.

As illustrated in FIG. 4, dowels 33 are intermittently coupled at boundaries between stacked steel sheets 31. In contrast, in the first embodiment, the first rotor core section 15 is press-fitted onto the boss 9, and the first rotor core section 15 and the boss 9 are press-fitted onto the rotor shaft 3. That is, the first rotor core section 15 is press-fitted twice. On the other hand, the second rotor core section 17 is press-fitted once. When the press-fitting is carried out twice, a strain is generated during the press-fitting, and hence the strain needs to be absorbed by some method.

As a method of absorbing the strain, firstly, a tolerance of the dowel portions of the stacked steel sheets is widely secured only at a mutual contact part between the cores, and thus the strain can be absorbed. As a more suitable method, however, at the contact part between the first rotor core section 15 and the second rotor core section 17, as illustrated in FIG. 5, the cores may be reversed in use (the dowels may be oriented in opposite directions) so as to prevent the coupling between the dowels. In this method, there is no need to absorb the strain to be generated due to the double press-fitting (press-fitting carried out twice), and thus such an effect is attained that the assembly between two types of cores can be facilitated. Note that, the relationship of the reversed dowels is applied between the first rotor core section 15 and the second rotor core section 17 in the structure of FIG. 1, and is applied between the first rotor core section 15 and the second rotor core section 17, and/or between the second rotor core section 17 and the third rotor core section 16 in the structure of FIG. 3.

Second Embodiment

Figure 6:
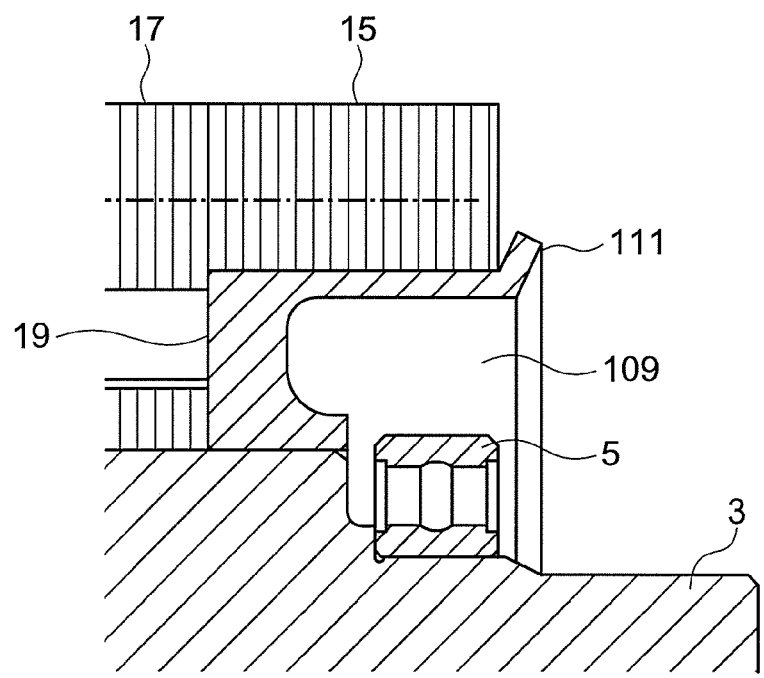
FIG. 6 is a view illustrating the vicinity of a boss of a rotor structure according to a second embodiment of the present invention.

Next, a rotor structure according to a second embodiment of the present invention is described with reference to FIG. 6. FIG. 6 is a schematic sectional view taken along a plane parallel to and passing through the rotational axis, for illustrating the vicinity of a boss of the rotor structure according to the second embodiment.

In the second embodiment, the boss section and the pressurizing section are formed of a common member. A boss 109 serving as the common member supports the first rotor core section 15, and an axial end portion of the boss 109 is clamped radially outward so as to pressurize the first rotor core section. The boss 109 according to the second embodiment has a substantially similar shape and material to those of the boss 9 according to the above-mentioned first embodiment. The second rotor core section 17 and the boss 109 are arranged on the outer circumference of the rotor shaft 3, and the first rotor core section 15 is arranged on an outer circumference of the boss 109. Note that, the boss 109 and the first rotor core section 15 are similarly easy to handle in the assembly step when those components are assembled in advance as a subassembly.

In addition, the second rotor core section 17 is pressurized by an abutment surface 19 of the boss 109, and further, the first rotor core section 15 arranged on the boss 109 is pressurized by clamping an axial end portion 111, which is a member forming the boss 109, radially outward. With this structure, similar actions and effects to those in the above-mentioned first embodiment can be attained, and further, the component corresponding to the ring according to the first embodiment can be omitted, thereby attaining an effect of reducing the number of components. Still further, the ring becomes unnecessary, and hence an effect of reducing the axial length of the boss can be expected. Note that, this feature may also be applied to the relationship between the second boss 10 and the second ring 12 in the above-mentioned structure illustrated in FIG. 3. Further, the structure illustrated in FIG. 5, in which the dowels are oriented in opposite directions, may also be applied to the second embodiment.

Third Embodiment

Figure 7:
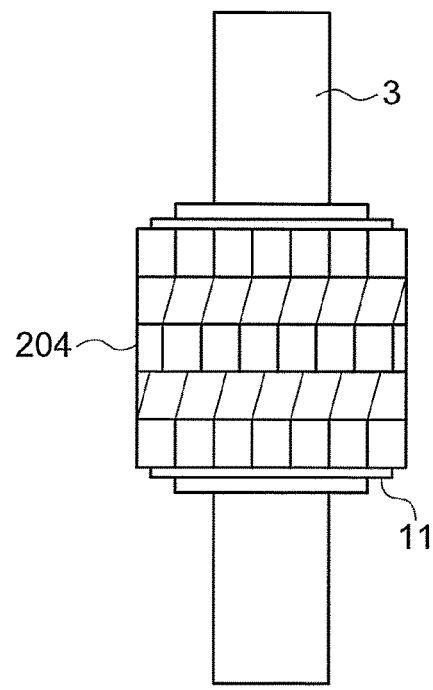
FIG. 7 is a view illustrating a situation in which an entire rotor is skewed according to a third embodiment of the present invention.
Figure 8:
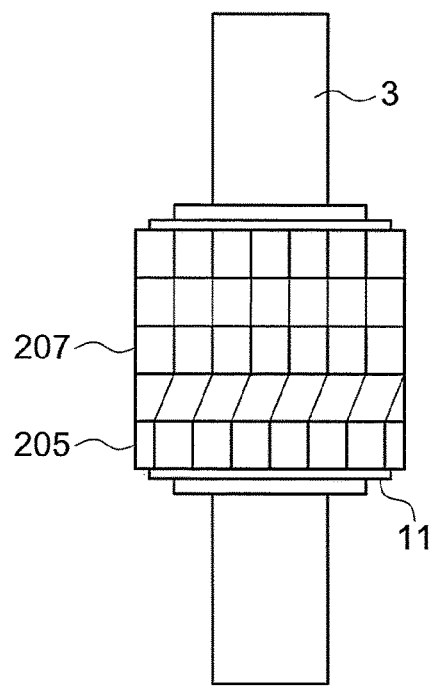
FIG. 8 is a view illustrating a state in which the rotor is skewed at a joint between core sections different in inner diameter according to the third embodiment of the present invention.

Next, a rotor structure according to a third embodiment of the present invention is described with reference to FIGS. 7 and 8. FIG. 7 is a view illustrating a situation in which an entire rotor is skewed. FIG. 8 is a view illustrating a state in which the rotor is skewed at a joint between core sections different in inner diameter.

The rotor core for fixing magnets has a structure in which, every time a plurality of steel sheets are stacked, the steel sheets are stacked in the axial direction with a shift in a rotational direction. Firstly, in FIG. 7, the entire rotor core is constructed as an entirely skewed section 204. When this structure is employed, an effect of suppressing cogging torque is attained.

Alternatively, there may be employed a structure in which the steel sheets are stacked in the axial direction while partially changing the rotational direction as illustrated in FIG. 8. In FIG. 8, the rotor core includes a skewed section 205 and a non-skewed section 207. In this case, the core having a larger inner diameter may be prepared offline, and hence the skewed structure can be constructed at a joint between the cores different in inner diameter. Further, magnetization may be carried out separately at the core sections different in inner diameter. When Lc is large, the magnetization is difficult, and hence the magnetization may be carried out twice separately. In this structure, however, the magnetization can be carried out separately under a state of the subassemblies of the rotor cores different in inner diameter, thereby attaining an advantage in that facility is constructed easily.

The details of the present invention have been described above specifically with reference to the preferred embodiments, but it is apparent that a person skilled in the art may employ various modifications based on the basic technical thoughts and teachings of the present invention.

REFERENCE SIGNS LIST

1 rotor structure, 3 rotor shaft, 5, 7 bearing, 9 boss (boss section), 10 second boss, 11 ring (pressurizing section), 12 second ring (pressurizing section), 15 first rotor core section, 16 third rotor core section, 17 second rotor core section, 19, 20 abutment surface, 109 boss (boss section, pressurizing section)

The invention claimed is:

1. A rotor structure of a rotary electric machine, comprising at least:
    a rotor shaft;
    a rotor core comprising a first rotor core section and a second rotor core section;
    a first boss section; and
    a pressurizing section,
    the second rotor core section and the first boss section being arranged on an outer circumference of the rotor shaft,
    the first rotor core section being arranged on an outer circumference of the first boss section,
    the pressurizing section being positioned on an axially outer side of the rotor core,
    the second rotor core section being pressurized by an abutment surface of the first boss section,
    the first rotor core section arranged on the boss section being pressurized by the pressurizing section,
    wherein the pressurizing section is a first ring having an innermost diameter that is greater than the outermost diameter of the first boss section to be fitted over the first boss section and the first ring is slidably engaged with the first boss section.

2. A rotor structure of a rotary electric machine according to claim 1, further comprising a second boss section and a second ring,
    wherein the rotor core further comprises a third rotor core section,
    wherein the pressurizing section further comprises the second ring,
    wherein the second boss section is arranged on the outer circumference of the rotor shaft,
    wherein the third rotor core section and the second ring are arranged on an outer circumference of the second boss section, and
    wherein the third rotor core section is pressurized by the second ring.

3. A rotor structure of a rotary electric machine according to claim 1, wherein dowels of the first rotor core section and dowels of the second rotor core section are oriented in opposite directions.

4. A rotor structure of a rotary electric machine according to claim 1,
    wherein the boss section and the pressurizing section are formed of a common member, and
    wherein the common member supports the first rotor core section, and has an axial end portion clamped radially outward so as to pressurize the first rotor core section.

5. A rotor structure of a rotary electric machine according to claim 1, wherein the entire rotor core or the first rotor core section alone is skewed.

6. A rotor structure of a rotary electric machine according to claim 1,
    wherein the first boss section has a radially inner portion formed into a hollow so as to be scooped out, and
    wherein the rotor structure further comprises a bearing for the rotor shaft, the bearing being arranged inside the first boss section.

7. A rotor structure of a rotary electric machine according to claim 1, wherein the first boss section is formed of a magnetic body.

8. A rotor structure of a rotary electric machine according to claim 1, wherein the first boss section extends axially inside of and axially outside of the first ring.

9. A rotor structure of a rotary electric machine according to claim 1, wherein the first boss section only does not contact an outer axial side of the rotor.

* * * * *